United States Patent
Ouderkirk et al.

(10) Patent No.: US 11,782,193 B1
(45) Date of Patent: *Oct. 10, 2023

(54) LIQUID LENS STRUCTURE WITH ADJUSTABLE OPTICAL POWER

(71) Applicant: Meta Platforms Technologies, LLC, Menlo Park, CA (US)

(72) Inventors: Andrew John Ouderkirk, Redmond, WA (US); Tristan Thomas Trutna, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/826,070

(22) Filed: Mar. 20, 2020

Related U.S. Application Data

(63) Continuation of application No. 15/870,443, filed on Jan. 12, 2018, now Pat. No. 10,634,824.

(51) Int. Cl.
*G02B 3/14* (2006.01)
*G02B 26/00* (2006.01)
*G02B 27/00* (2006.01)

(52) U.S. Cl.
CPC ............... *G02B 3/14* (2013.01); *G02B 26/004* (2013.01); *G02B 27/0075* (2013.01)

(58) Field of Classification Search
CPC ..... G02B 3/14; G02B 26/004; G02B 26/0875; G02B 27/0075; H04N 5/7491; G02B 27/0172
See application file for complete search history.

(56) References Cited

U.S. PATENT DOCUMENTS

| | | | |
|---|---|---|---|
| 10,634,824 B1* | 4/2020 | Ouderkirk et al. . | G02B 27/0172 |
| 2005/0030438 A1* | 2/2005 | Nishioka ............... | G02C 7/085 |
| | | | 349/21 |
| 2010/0118414 A1* | 5/2010 | Bolis ....................... | G02B 3/14 |
| | | | 359/666 |
| 2014/0355101 A1* | 12/2014 | Shian et al. ......... | G02B 26/005 |
| | | | 359/290 |
| 2017/0017019 A1 | 1/2017 | Bolis | |
| 2017/0199383 A1* | 7/2017 | Machida ........... | G02B 27/1086 |

FOREIGN PATENT DOCUMENTS

GB        1596895 A *  9/1981 ............. G02B 26/0816

* cited by examiner

*Primary Examiner* — Alicia M Harrington
(74) *Attorney, Agent, or Firm* — Fenwick & West LLP

(57) ABSTRACT

A liquid lens structure has an adjustable and continuous range of optical power. The liquid lens structure comprises a substrate layer and a deformable membrane which enclose a volume of liquid. The substrate layer is at least partially transparent in the optical band. The deformable membrane comprises a ground layer, two membrane layers, and two conductive layers. Each of the two conductive layers control electrical voltage applied to one of the membrane layers in reference to the ground layer, wherein each membrane layer deforms in response to applied electrical voltage. The deformation of the two membrane layers adjusts a curvature of the deformable membrane which provides the adjustable continuous range of optical power to the liquid lens structure.

16 Claims, 7 Drawing Sheets

LIQUID LENS STRUCTURE WITH ADJUSTABLE OPTICAL POWER

CROSS REFERENCE TO RELATED APPLICATIONS

This application is a continuation of co-pending U.S. Application No. 15/870,443, filed Jan. 12, 2018, which is incorporated by reference in its entirety.

BACKGROUND

The present disclosure generally relates to varifocal lens structures, more specifically to a liquid lens structure with an adjustable optical power.

Artificial reality systems conventionally utilize a head-mounted display (HMD) to simulate virtual or augmented environments. For example, stereoscopic images can be displayed on an electronic display inside the HMD to simulate the illusion of depth and position sensors can be used to estimate what portion of the virtual environment is being viewed by the user. Such a simulation, however, can cause visual fatigue and nausea resulting from an inability of conventional optical systems of HMDs to correctly render or otherwise compensate for vergence and accommodation conflicts.

SUMMARY

A varifocal block has a continuous range of adjustment of optical power. The varifocal block includes at least a liquid lens structure with a continuous range of adjustment of optical power. The liquid lens structure comprises a substrate layer and a deformable membrane which enclose a volume of liquid. The substrate layer is at least partially transparent in the optical band. The deformable membrane comprises a ground layer, two piezoelectric membrane layers, and two conductive layers. Each of the two conductive layers control electrical voltage applied to one of the piezoelectric membrane layers, wherein each piezoelectric membrane layer deforms in response to applied electrical voltage. The deformation of the two piezoelectric membrane layers adjusts a curvature to the deformable membrane which provides the continuous range of optical power to the liquid lens structure.

The varifocal block may be part of a head-mounted display (HMD) within an artificial reality system. The HMD presents content via an electronic display to a wearing user at a focal distance. The varifocal block presents the content over a plurality of image planes that are associated with different optical powers of the varifocal block. As noted above, the varifocal block has a continuous range of adjustment of optical power. Each value of optical power over the continuous range of adjustment of optical power corresponds to a different image plane of the plurality of image planes. In some embodiments, the varifocal block adjusts the image plane location in accordance with instructions from the HMD to, e.g., mitigate vergence accommodation conflict of eyes of the wearing user. The image plane location is adjusted by adjusting an optical power associated with the varifocal block, and specifically by adjusting the optical powers associated with the liquid lens structure.

DETAILED DESCRIPTION

Configuration Overview

Figure 1A:
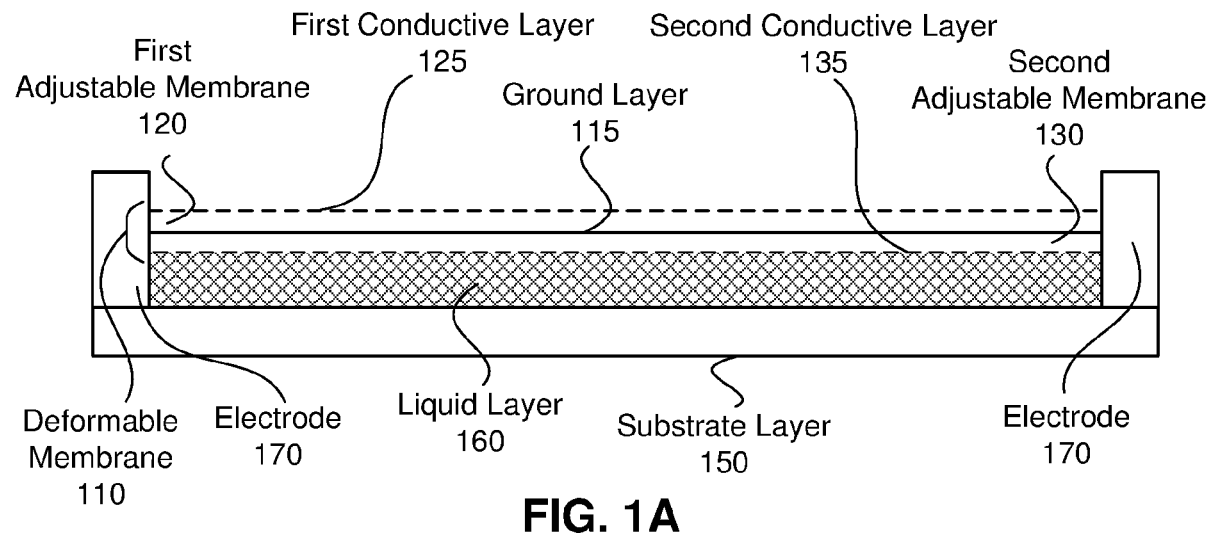
FIG. 1A is cross sectional view of a liquid lens structure at a first optical power, in accordance with an embodiment.

An artificial reality system includes a head-mounted display (HMD). The HMD includes at least a varifocal block. The HMD of an artificial reality system presents content via an electronic display to a wearing user at a focal distance. The varifocal block adjusts the focal distance in accordance with instructions from the HMD to, e.g., mitigate vergence accommodation conflict of eyes of the wearing user. The focal distance is adjusted by adjusting an optical power associated with the varifocal block, and specifically by adjusting the optical powers associated with one or more varifocal structures within the varifocal block. The varifocal block can have one or more varifocal structures and other optical devices in optical series. Optical series refers to relative positioning of a plurality of optical devices such that light, for each optical device of the plurality of optical devices, is transmitted by that optical device before being transmitted by another optical device of the plurality of optical devices. Moreover, ordering of the optical devices does not matter. For example, optical device A placed before optical device B, or optical device B placed before optical device A, are both in optical series. Similar to electric circuitry design, optical series represent optical devices with their optical properties compounded when placed in series.

A varifocal structure is an optical device that is configured to dynamically adjust its focus in accordance with instructions from the artificial reality system. The varifocal structure is a liquid lens structure in this present disclosure. The liquid lens structures includes at least a substrate layer and a deformable membrane with a volume of liquid enclosed between the substrate layer and the deformable membrane. The deformable membrane comprises at least a ground layer with a plurality of conductive layers coupled to a plurality of membrane layers such that the curvature of the plurality of membrane layers depend on voltages applied by the plurality of conductive layers.

The liquid lens structure is an optical device that is able to adjust focus (i.e., optical power) over a continuous range from a positive value to a negative value. There are fixed volume fluid filled lenses, and variable volume fluid-filled lenses. For HMD applications, a fixed-volume liquid lens can be preferable for many reasons. For example, the fixed-volume liquid lens offers a compact design, a large clear aperture size and a stable optical performance within the variable focus range (e.g. no air bubble, freedom on the frame/lens shape). In this application, a liquid lens structure with a deformable membrane has a continuous range of 0 to F (in terms of optical power this may be represented as 0 to D.

The HMD of an artificial reality system presents artificial reality content to a wearing user. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Vergence-Accommodation Overview

Vergence-accommodation conflict is a problem in many artificial reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence depth of the new object. In an example, a user is looking at a real object. As the real object is moved closer or farther to the user, each eye rotates inward or outward (i.e., convergence or divergence) to stay verged on the real object. As the real object moves, the eyes must "accommodate" for the different focal distance of the real object by changing its shape to reduce the power or focal length. In artificial reality, virtual objects need to be presented.

In artificial reality systems, a virtual object is presented on the electronic display of the HMD that is part of the artificial reality system. The light emitted by the HMD is configured to have a particular focal distance, such that the virtual scene appears to a user at a particular focal plane. As the content to be rendered moves closer/farther from the user, the HMD correspondingly instructs the varifocal block to adjust the focal distance to mitigate a possibility of a user experiencing a conflict with eye vergence and eye accommodation. Additionally, in some embodiments, the HMD may track a user's eyes such that the artificial reality system is able to approximate gaze lines and determine a gaze point including a vergence depth (an estimated point of intersection of the gaze lines) to determine an appropriate amount of accommodation to provide the user. The gaze point identifies an object or plane of focus for a particular frame of the virtual scene and the HMD adjusts the distance of the varifocal block to keep the user's eyes in a zone of comfort as vergence and accommodation change.

Varifocal Liquid Lens Structure

FIG. 1A is cross sectional view of a liquid lens structure 100 at a first optical power, in accordance with an embodiment. The liquid lens structure 100 comprises a deformable membrane 110, a substrate layer 150, a liquid layer 160, and a plurality of electrodes 170. In accordance with one or more embodiments, the liquid lens structure 100 has the liquid layer 160 coupled between the deformable membrane 110 and the substrate layer 150. The plurality of electrodes 170 are along a peripheral edge of the liquid lens structure 100. The deformable membrane 110 comprises a ground layer 115, a first adjustable membrane 120, a first conductive layer 125, a second adjustable membrane 130, and a second conductive layer 135. The liquid lens structure 100 is an optical device that is able to adjust focus (i.e., optical power) over a continuous range by adjusting a tunable curvature to the deformable membrane 110.

The deformable membrane 110 changes its curvature to provide an adjustable focus of the liquid lens structure 100. An edge of the deformable membrane 110 is fixed along the peripheral edge of the liquid lens structure 100 such that the deformable membrane is electrically coupled to the plurality of electrodes 170. The deformable membrane 110 may be fixed along the peripheral edge with some amount of tension or no tension applied to the deformable membrane 110. Additionally, tension can be applied to the deformable membrane 110 after its edge is fixed along the peripheral edge of the liquid lens structure 100. The deformable membrane 110 comprises the ground layer 115, the first adjustable membrane 120, the first conductive layer 125, the second adjustable membrane 130, and the second conductive layer 135. The side of the deformable membrane 110 that is in contact with the liquid layer 160 is defined as an interior side; whereas a side opposite that of the interior side is defined as an exterior side. In accordance with an embodiment, the ground layer 115 is coupled between the first adjustable membrane 120 and the second adjustable membrane 130. The first conductive layer 125 is coupled to the first adjustable membrane 120 on the exterior side of the deformable membrane 110. The second conductive layer 135 is coupled to the second adjustable membrane 130 on the interior side of the deformable membrane 110. Through adjusting a first voltage through the first adjustable membrane 120 and a second voltage through the second adjustable membrane 130, the deformable membrane can control mechanical strain of the first adjustable membrane 120 and the second adjustable membrane 130. The controllable mechanical strain of the first adjustable membrane 120 and of the second adjustable membrane 130 provides a continuous range of curvature of the deformable membrane 110. In accordance with the illustration of FIG. 1A, the deformable membrane 110 has no induced curvature thus setting the liquid lens structure 100 at a first optical power either additive or subtractive. Although the deformable membrane 110 has no induced curvature, other components of the liquid lens structure 100 can add or subtract optical power to the liquid lens structure 100.

The ground layer 115 of the deformable membrane 110 is configured as a reference for voltage differences applied to the first conductive layer 125 and the second conductive layer 135. The ground layer 115 is composed of a flexible and thin conductive material. The ground layer 115 is substantially transparent such that the ground layer 115 transmits some amount of light. For example, the flexible and thin conductive material can be a conductive metal that is substantially transparent, e.g., Indium Tin Oxide (ITO), Aluminum Zinc Oxide (AZO), etc., in accordance with one or more embodiments. The ground layer 115 is coupled to one or more electrodes of the plurality of electrodes 170. In accordance with some embodiments, the ground layer 115 is a conductive wire mesh.

The first adjustable membrane 120 undergoes mechanical strain in response to an applied voltage. The first adjustable membrane 120 is composed of substantially transparent piezoelectric material that strains in at least one dimension when an electrical voltage is applied. For example, the first adjustable membrane 120 is composed of polyvinylidene difluoride (PVDF) which is a polymer piezoelectric material. In other examples, other piezoelectric materials can be used to construct the first adjustable membrane 120. Additionally, other electroactive polymers, elastomers, and gels may be used. For example poled or un-poled PVDF, poled or unpoled PVDF:TfPE copolymers and other copolymers of PVDF, acrylics including, for example, 3M™ VHB™ adhesive, and silicones including polydimethylsilicone (PDMS). The polymer may be used as a bimorph, where there are two bonded electroactive materials, or a unimorph, where an electroactive material is bonded to a non-activated material. The non-activated material may inherently have a low mechanical response to electric fields (for example glass, polyethylene terephthalate, polycarbonate, cyclic polyolefins, etc.), or may be an electroactive material that does not experience substantially changing electric fields. As an electrical voltage is applied to the first adjustable membrane 120, the first adjustable membrane 120 strains in at least one dimension. As the first adjustable membrane 120 is a component of the deformable membrane 110, likewise an edge of the first adjustable membrane 120 is fixed along the peripheral edge of the liquid lens structure 100. In some embodiments, the edge of the first adjustable membrane 120 is fixed along the peripheral edge of the liquid lens structure 100 while the first adjustable membrane 120 maintains some tension. In other embodiments, there is no tension initially present when the edge of the first adjustable membrane 120 is fixed. Additionally in some embodiments, some tension is applied to the first adjustable membrane 120 after its edge is fixed. As the first adjustable membrane 120 strains, a first curvature is induced within the first adjustable membrane 120.

The first conductive layer 125 conducts electricity to provide a voltage difference through the first adjustable membrane 120. The first conductive layer 125 is composed of a flexible and thin conductive material. Similarly in the material composition of the ground layer 115, the first conductive layer 125 can be a conductive metal which is substantially transparent, in accordance with one or more embodiments. For example, the first conductive layer 125 can be composed of ITO, a copper metal mesh, metallic nanowires, metal oxide nanowires, etc. In other embodiments, the ground layer 115 is a conductive film. In other embodiments, the thin conductive layer can be made from filaments such as carbon nanotubes or metal (e.g. silver or gold) nanowires dispersed in a matrix such as a polymer binder. In other embodiments, the transparent conductive coating can be a conductive polymer such as poly(3,4-ethylenedioxythiophene) (PEDOT), poly(3,4-ethylenedioxythiophene) (PEDOT):poly(styrene sulfonate) (PSS), or poly(4,4-dioctyl cyclopentadithiophene). These conductive polymers may also be doped. The transparent conductive coating may also be combinations of these different conductive materials.

The first conductive layer 125 is also coupled to one or more electrodes of the plurality of electrodes 170. In reference to the ground layer 115, the first conductive layer 125 adjusts the first voltage through the first adjustable membrane 120. In one or more embodiments, the first conductive layer 125 comprises a plurality of conductive wires. In some embodiments, the plurality of conductive wires are non-intersecting; whereas, in other embodiments, the plurality of conductive wires are intersecting. For example, embodiments wherein the plurality of conductive wires are non-intersecting, the plurality of conductive wires are arranged in a parallel fashion. In some embodiments, the first conductive layer 125 contains at least two or more differing voltages to two or more points of the first conductive layer 125 through the first adjustable membrane 120. The two or more differing voltages provides two or more differing curvatures to portions of the first adjustable membrane 120. In other embodiments, the first conductive layer 125 comprises a plurality of conductive wires which are placed in a meandering pattern, e.g., zig zag, serpentine, sinusoidal, etc., so as to reduce noticeability by a user.

The second adjustable membrane 130 and the second conductive layer 135 are similar to the first adjustable membrane 120 and the first conductive layer 125, thus the detailed description thereof is omitted herein for the sake of brevity. In some embodiments, the first adjustable membrane 120 and the second adjustable membrane 130 may have uniform dimensions (e.g. uniform thickness, uniform surface area, etc.) and/or may be constructed from uniform materials with uniform properties. In other embodiments, the first adjustable membrane 120 and the second adjustable membrane 130 may have differing dimension and/or may be constructed from differing materials with different properties. In these embodiments, the differences between the first adjustable membrane 120 and the second adjustable membrane 130 can be used to form various lens shapes (e.g. aspherical, cylindrical, etc.). In more embodiments, one or both of the first adjustable membrane 120 and the second adjustable membrane 130 maintain some amount of tension. Similarly, there are embodiments where the first conductive layer 125 and the second conductive layer 135 are uniform in shape, material, properties, pattern, etc. with other embodiments where the two differ in one or more factors.

The substrate layer 150, the plurality of electrodes 170, and the deformable membrane 110 enclose the liquid layer 160. The substrate layer 150 is substantially transparent in the visible band (~380 nm to ~750 nm). In some embodiments, the substrate layer 150 is also transparent in some or all of the infrared band (~750 nm to 1000 nm). The substrate layer 150 may be composed of e.g., $SiO_2$, plastic, sapphire, thermoplastics, etc. In some embodiments, the substrate layer 150 is flat such that the substrate layer 150 does not contribute to the optical power of the liquid lens structure 100. In other embodiments, the substrate layer 150 is curved contributing to the optical power of the liquid lens structure 100. For example, the substrate layer 150 may be formed to act as an aspherical lens, a spherical lens, a freeform optic, a Fresnel lens, or have some other optical element that provides a fixed amount of optical power. The substrate layer 150 may also act as a foundation for additional components or additional optical devices to the liquid lens structure 100. For example, coupled to the substrate layer 150 is an optical filter, a waveplate, a polarizer, a lens, another optical device, or a combination thereof.

Figure 1B:
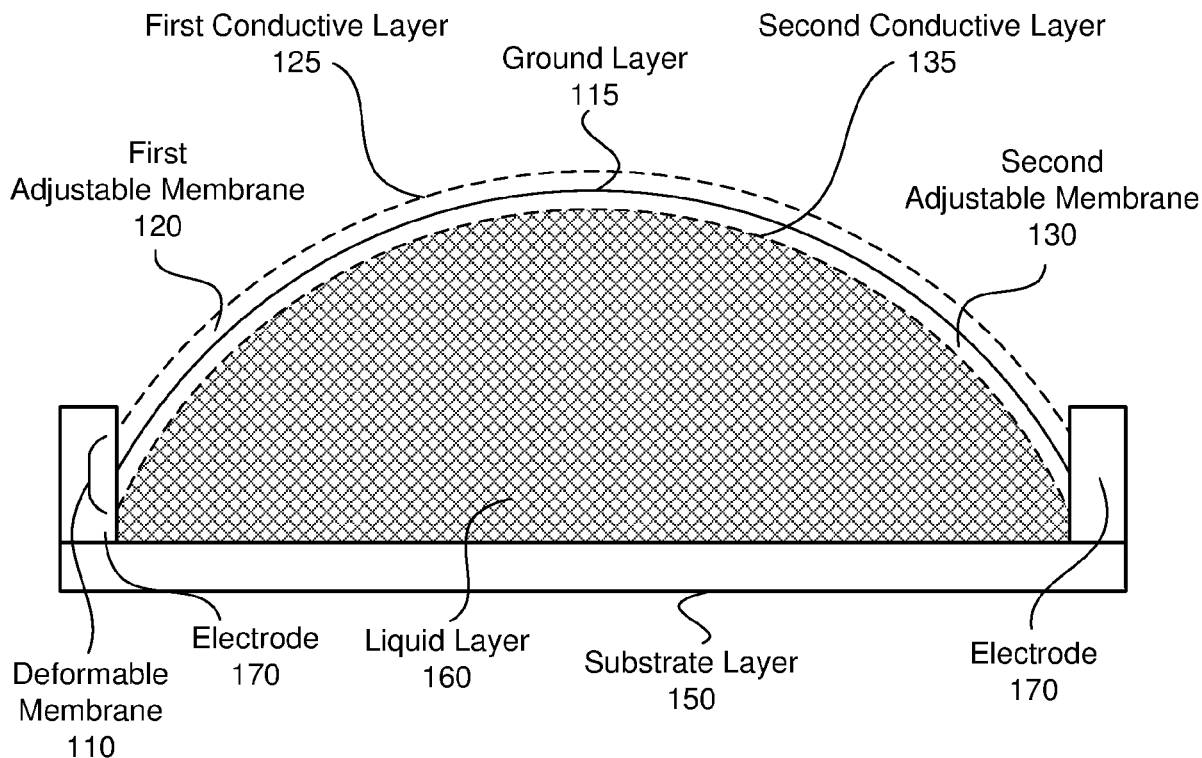
FIG. 1B is cross sectional view of the liquid lens structure of FIG. 1A at a second optical power, in accordance with an embodiment.

The liquid layer 160 is a volume of liquid of the liquid lens structure 100. The liquid layer 160 includes one or more liquids which are substantially transparent in an optical band of interest. The volume of liquid in the liquid layer 160 is constant or variable. In the illustration of FIG. 1B, the liquid layer 160 of the liquid lens structure 100 is variable such that in FIG. 1B, there is a greater volume of fluid in the liquid layer 160 compared to that in FIG. 1A. The one or more liquids which comprise the liquid layer 160 have refractive indices between 1.2 and 2.5. Suitable fluids include fluorocarbons, silicone oils, including fluid available from Dow Chemical, phenyl silicones, high index fluids containing bromine, iodine, or sulfur, or combinations thereof. The refractive indices of the one or more liquids influences the range of continuous optical power for the liquid lens structure 100. For example, given a certain range for curvature of the deformable membrane, a liquid layer 160 with a higher refractive index would result in a liquid lens structure 100 with a larger range of continuous optical power in comparison to a liquid layer 160 with a lower refractive index.

The plurality of electrodes 170 provides an electrical voltage to the deformable membrane 110 from a variable voltage supply. The plurality of electrodes 170 is coupled to the variable voltage supply (not shown in FIGS. 1A nor 1B) and to the ground layer 115, the first conductive layer 125, and the second conductive layer 135 of the deformable membrane 110. Of the plurality of electrodes 170, there are at least three subsets of electrodes. A first subset of electrodes is coupled to the ground layer 115; a second subset of electrodes is coupled to the first conductive layer 125; a third subset of electrodes is coupled to the second conductive layer 135. The plurality of electrodes 170 provides variable electrical voltages such that liquid lens structure 100 has the tunable curvature of the deformable membrane 110. In some embodiments, each subset of electrodes provides two or more differing voltages to two or more portions of the deformable membrane 110; thus the deformable membrane 110 can have one or more portions with differing curvatures. For example, a first voltage of a first polarity and first magnitude is applied to the first conductive layer 125; whereas a second voltage of a second polarity and a second magnitude is applied to the second conductive layer 135. In another example, a first voltage of a first polarity and a first magnitude is applied to a portion of the first conductive layer 125; whereas, a second voltage of a second polarity and a second magnitude is applied to another portion of the first conductive layer 125. In these embodiments, portions of the deformable membrane 110 with differing curvatures add or subtract varying degrees of optical power to the liquid lens structure 100.

FIG. 1B is cross sectional view of the liquid lens structure 100 of FIG. 1A at a second optical power, in accordance with an embodiment. In accordance with this illustration, the deformable membrane 110 is curved spherically such that the deformable membrane 110 provides the second optical power. The first voltage applied through the first adjustable membrane 120 along with the second voltage applied through the second adjustable membrane 130 curves the deformable membrane 110 to provide the spherical curvature. From the spherical curvature, the liquid lens structure 100 has the second optical power which is larger in magnitude than the first optical power as shown in FIG. 1A. With the deformable membrane 110 able to change its curvature in a continuous fashion, the liquid lens structure 100 has a continuous range of optical power. This continuous range of optical power can range anywhere from -2 Diopters to +2 Diopters.

The continuous range of optical power that the liquid lens structure 100 has provides an adjustable range of focal distance. In accordance with one or embodiments, the liquid lens structure 100 can be an optical device of a varifocal block in a HMD. A focal distance of the varifocal block depends in part on the continuous range of optical power of the liquid lens structure 100. The liquid lens structure 100, in these embodiments, can be controlled to aid in adjusting the focal distance of the varifocal block in accordance with instructions from the HMD to, e.g., mitigate vergence accommodation conflict of eyes of the wearing user.

Conductive Layer Configurations

Figure 2A:
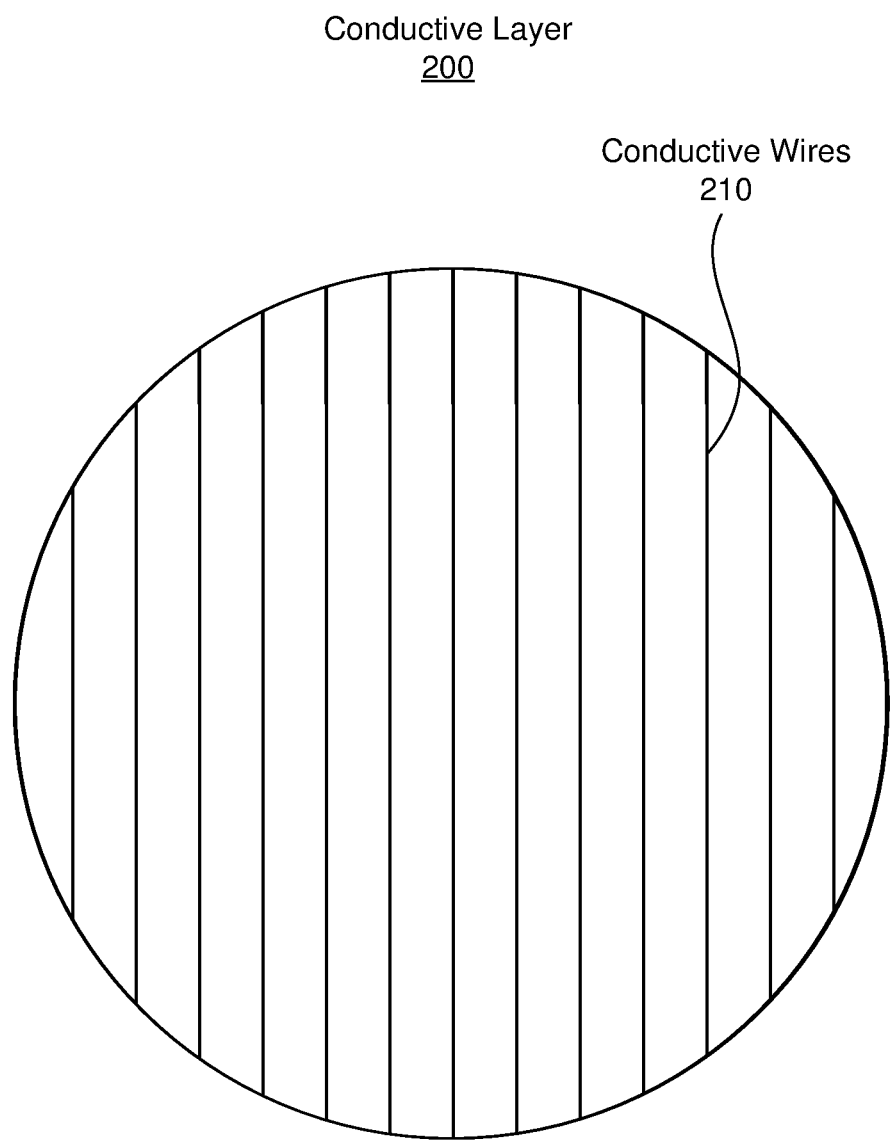
FIG. 2A is a top plan view of a conductive layer with non-intersecting conductive wires, in accordance with one or more embodiments.

FIG. 2A is a top plan view of a conductive layer 200 with non-intersecting conductive wires 210, in accordance with one or more embodiments. The conductive layer 200 can be at least one of the ground layer 115, the first conductive layer 125, and the second conductive layer 135 of the liquid lens structure 100 of FIG. 1. In some embodiments (as shown by the illustration), the non-intersecting conductive wires 210 are coplanar and spaced evenly in a parallel fashion. The non-intersecting conductive wires 210 can also be arranged in a skew fashion such that the non-intersecting conductive wires are skew (not shown in this illustration). In some embodiments, all the non-intersecting conductive wires 210 are coupled to one electrode such as one electrode of the plurality of electrodes 170 of the liquid lens structure 100 of FIG. 1. In other embodiments, a first conductive wire of the non-intersecting conductive wires 210 is coupled to a first electrode with a second conductive wire of the non-intersecting conductive wires 210 coupled to a second electrode such that the first conductive wire completes a different circuit from the second conductive wire. In these embodiments, the conductive layer 200 can provide a plurality of voltages to different conductive wires of the non-intersecting conductive wires 210. In the context of the liquid lens structure 100, the conductive layer 200 (as one of the ground layer 115, the first conductive layer 125, and the second conductive layer 135) can provide a plurality of voltages to different portions of a corresponding adjustable membrane to introduce at least two curvatures to the corresponding adjustable membrane. In accordance with some embodiments with the non-intersecting conductive wires 210 spaced evenly in a parallel fashion, the conductive layer 200 can curve a corresponding adjustable membrane in one dimension. In other variations, the non-intersecting conductive wires 210 can vary in spacing with the number of non-intersecting conductive wires 210 also varying.

Figure 2B:
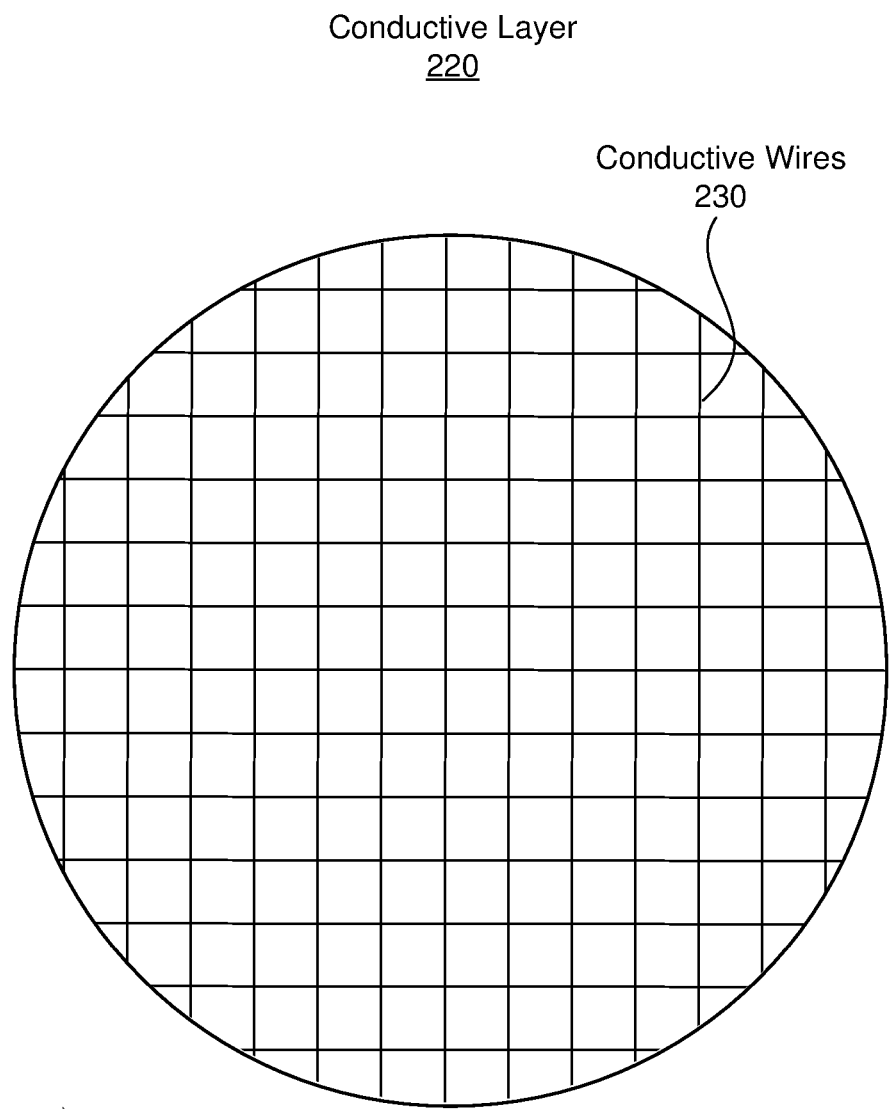
FIG. 2B is a top plan view of a conductive layer with intersecting conductive wires, in accordance with one or more embodiments.

FIG. 2B is a top plan view of a conductive layer 220 with intersecting conductive wires 230, in accordance with one or more embodiments. The conductive layer 220 can be at least one of the ground layer 115, the first conductive layer 125, and the second conductive layer 135 of the liquid lens structure 100 of FIG. 1. In some embodiments (as shown by the illustration), the intersecting conductive wires 230 are coplanar and arranged in a crosshatch pattern. In this illustration, the intersecting conductive wires 230 are in a crosshatch pattern, specifically a square grid. In some embodiments, all the intersecting conductive wires 230 are coupled to one electrode such as one electrode of the plurality of electrodes 170 of the liquid lens structure 100 of FIG. 1. In these embodiments, the conductive layer 200 provides one voltage over all the intersecting conductive wires 230. In the context of the liquid lens structure 100, the conductive layer 220 (as one of the ground layer 115, the first conductive layer 125, and the second conductive layer 135) provides one voltage over an entirety of a corresponding adjustable membrane to introduce one curvature to the corresponding adjustable membrane.

Figure 2C:
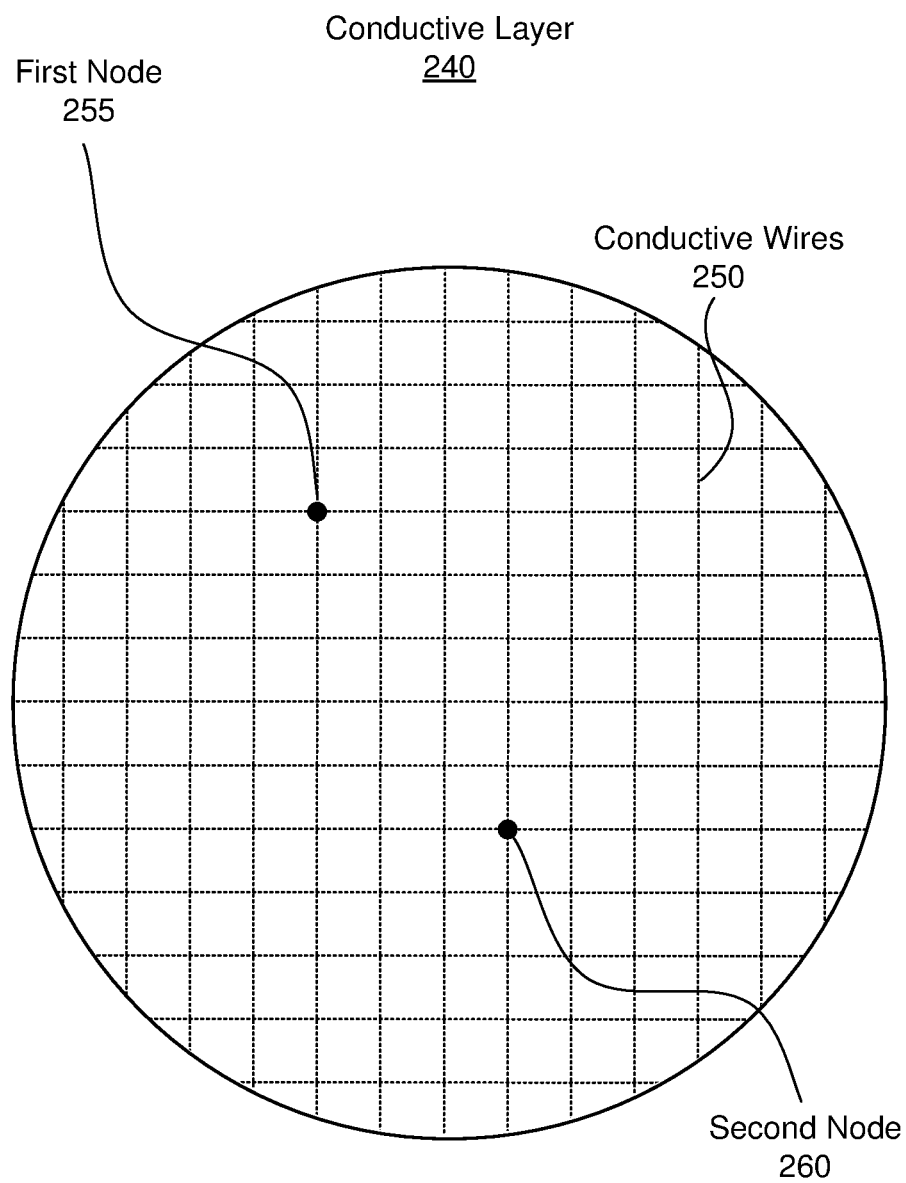
FIG. 2C is a top plan view of a conductive layer with addressable nodes, in accordance with one or more embodiments.

FIG. 2C is a top plan view of a conductive layer 240 with addressable nodes, in accordance with one or more embodiments. The conductive layer 240 can be at least one of the ground layer 115, the first conductive layer 125, and the second conductive layer 135 of the liquid lens structure 100 of FIG. 1. The conductive layer 240 comprises conductive wires 250 (such as those described in FIG. 2A or FIG. 2B) with the ability to provide a plurality of addressable nodes with varying voltages. In accordance with this illustration, there is a first node 255 and a second node 260 of the plurality of addressable nodes. The conductive layer 240 can provide a first voltage to the first node 255 and a second voltage to the second node 260 in tandem such that a corresponding first portion of an adjustable membrane can differ in its induced curvature from that of a corresponding second portion of the adjustable membrane. For example, a first half of the conductive layer 240 can induce a first optical power in the liquid lens structure 100 with a second half of the conductive layer 240 inducing a second optical power in the liquid lens structure 100. This functionality can provide a bifocal feature to the liquid lens structure 100. This functionality can also be used to correct for optical aberrations or distortions, e.g., astigmatism, field curvature, etc.

Figure 2D:
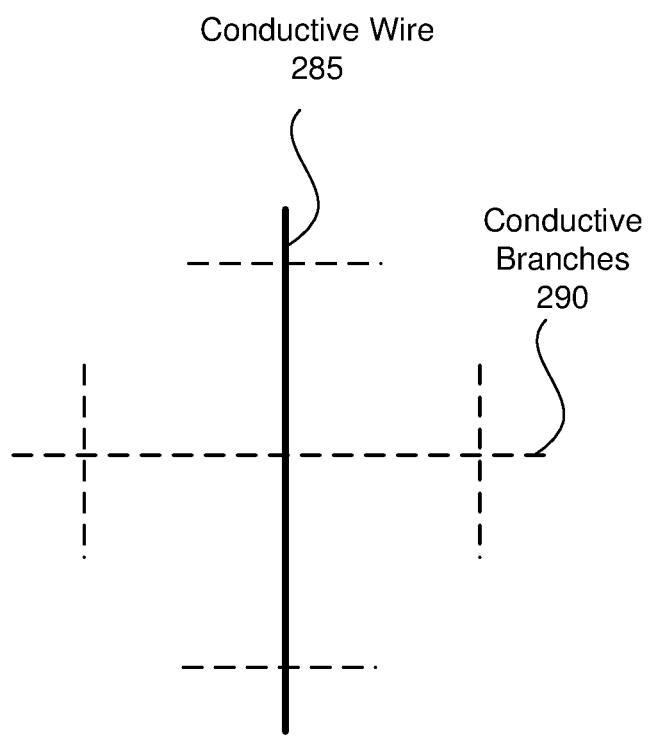
FIG. 2D is a top plan view of a portion of a conductive layer with conductive branching, in accordance with one or more embodiments.

FIG. 2D is a top plan view of a portion of a conductive layer with conductive branching 280, in accordance with one or more embodiments. The embodiments described herein can be implemented in any embodiments of the conductive layers as described in FIGS. 2A - 2C. The conductive branching 280 can be incorporated into a conductive layer, wherein the conductive layer is at least one of the ground layer 115, the first conductive layer 125, and the second conductive layer 135 of the liquid lens structure 100 of FIG. 1. The conductive branching 280 builds a plurality of conductive branches 290 off of a portion of a conductive wire 285 (such as those described in FIG. 2A or FIG. 2B). The conductive branches 290 branch off the conductive wire 285 in a variety of patterns. In the illustrative example of FIG. 2D, there is a subset of conductive branches of the plurality of conductive branches 290 which intersect the conductive wire 280 and other conductive branches of the plurality of conductive branches 290 which intersect the subset. In other embodiments, the plurality of conductive branches 290 only intersect the conductive wire 285. The plurality of conductive branches 290 help to spread a voltage applied through the conductive wire 285 over a bigger area. In the context of the liquid lens structure 100, the conductive layer with the conductive branching 280 (as one of the ground layer 115, the first conductive layer 125, and the second conductive layer 135) provides a voltage over a wider area of a corresponding adjustable membrane to introduce a more uniform curvature to the corresponding adjustable membrane.

In accordance with other embodiments, a conductive layer can have conductive branching in a meandering pattern. In the illustration of FIG. 1, the conductive branching 280 configures the conductive layer with straight wires, branching off one another in an orthogonal pattern. In various other embodiments, the conductive branching has the meandering pattern with a similar purpose of spreading voltage applied through the conductive layer over a larger area. The meandering patterns can vary such as zigzag, serpentine, sinusoidal, other curves. The conductive branching can build off of these meandering patterns with branches intersecting the meandering conductive wires. In additional embodiments, a subset of the conductive wires of the conductive layer can meander in accordance with one pattern with another subset of the conductive wires meandering in accordance with another pattern. The meandering pattern of the conductive branching reduces noticeability of the conductive layer to a user as there is less ordering to the conductive branching.

Head-Mounted Display Configuration Overview

Figure 3A:
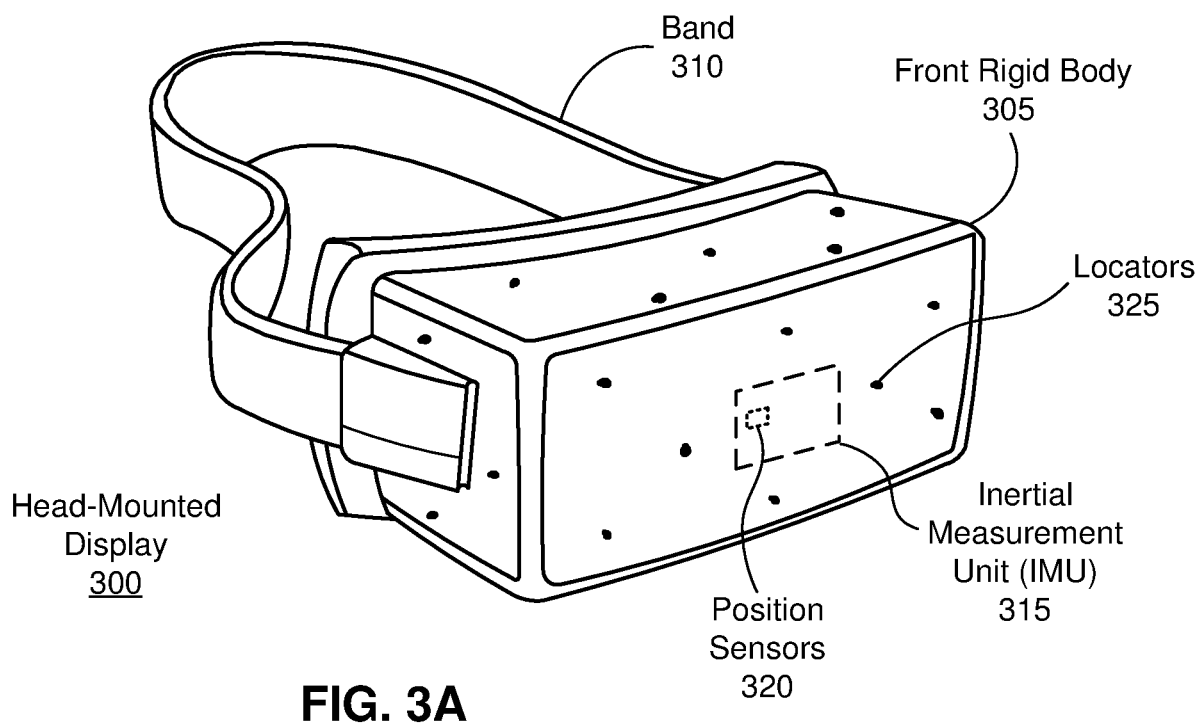
FIG. 3A is a perspective view of a head-mounted display (HMD), in accordance with one or more embodiments.

FIG. 3A is a perspective view of a head-mounted display 300 (HMD 300), in accordance with one or more embodiments. The HMD 300 presents content to a user. The HMD 300 includes a front rigid body 305 and a band 310. The band 310 secures the front rigid body 305 to a user's head. The front rigid body 305 includes one or more electronic display elements of an electronic display (shown in FIG. 3B), an IMU 315, the one or more position sensors 320, and the locators 325. In the embodiment shown by FIG. 3A, the position sensors 320 are located within the IMU 315, and neither the IMU 315 nor the position sensors 320 are visible to the user. The IMU 315, the position sensors 320, and the locators 325 are discussed in detail below with regard to FIG. 4. Note in embodiments where the HMD 300 acts as an AR or MR device, portions of the HMD 300 and its internal components are at least partially transparent.

Figure 3B:
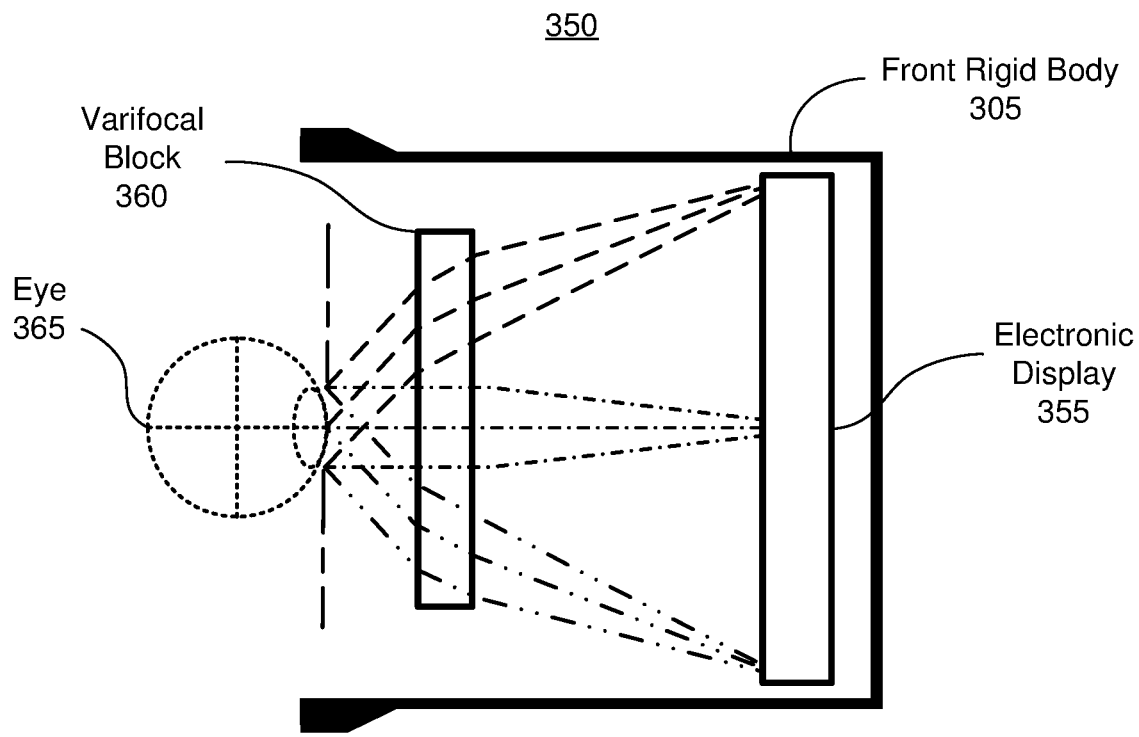
FIG. 3B is a cross sectional view of the front rigid body of the HMD of FIG. 3A, in accordance with one or more embodiments.

FIG. 3B is a cross sectional view 350 of the front rigid body 305 of the HMD 300 of FIG. 3, in accordance with one or more embodiments. As shown in FIG. 3B, the front rigid body 305 includes an electronic display element 355 and a varifocal block 360 that together are incorporated so as to provide image light to an eye 365 of a user. The eye 365 of a user is typically positioned at the front rigid body 305. For purposes of illustration, FIG. 3B shows a cross sectional view 350 associated with the single eye 365, but another varifocal block 360, separate from the varifocal block 360 shown in this illustration, provides altered image light to another eye 365 of the user.

The electronic display element 355 displays images to the user. In various embodiments, the electronic display element 355 may comprise a single electronic display or multiple electronic displays (e.g., a display for each eye of a user). Examples of the electronic display element 355 include: a liquid crystal display (LCD), an organic light emitting diode (OLED) display, an active-matrix organic light-emitting diode display (AMOLED), a QOLED, a QLED, a micro-LED, some other display, or some combination thereof.

The varifocal block 360 adjusts an orientation from light emitted from the electronic display element 355 such that it appears at particular focal distances from the user. The varifocal block 360 includes one or more optical devices in optical series. An optical device may be configured to dynamically adjust its focus in accordance with instructions from an artificial reality system. The varifocal block 360 may include the liquid lens structure 100 as described in FIG. 1 to adjust its focus.

Artificial Reality System Overview

Figure 4:
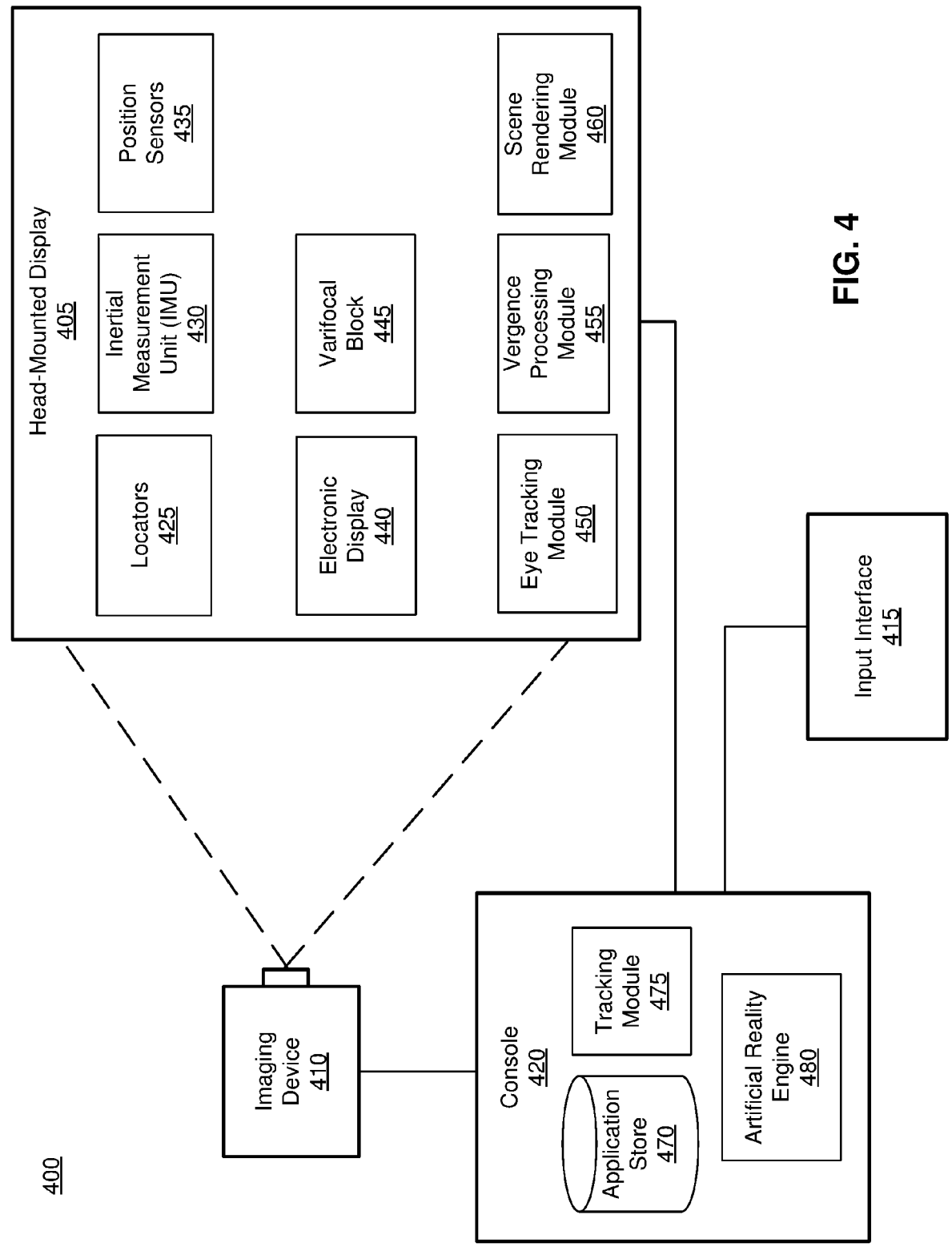
FIG. 4 is a block diagram of an artificial reality system in which the HMD of FIG. 3 operates, in accordance with one or more embodiments.

FIG. 4 is a block diagram of an artificial reality system 400 in which the HMD 405 operates, in accordance with one or more embodiments. The artificial reality system 400 may be for use as a virtual reality (VR) system, an augmented reality (AR) system, a mixed reality (MR) system, or some combination thereof. In this example, the artificial reality system 400 includes the HMD 405, an imaging device 410, and an input interface 415, which are each coupled to a console 420. While FIG. 4 shows a single HMD 405, a single imaging device 410, and a single input interface 415, in other embodiments, any number of these components may be included in the artificial reality system 400. For example, there may be multiple HMDs 300 each having an associated input interface 415 and being monitored by one or more imaging devices 410, with each HMD 405, input interface 415, and imaging devices 410 communicating with the console 420. In alternative configurations, different and/or additional components may also be included in the artificial reality system 400.

The HMD 405 may act as an artificial reality HMD. An MR and/or AR HMD augments views of a physical, real-world environment with computer-generated elements (e.g., images, video, sound, etc.). The HMD 405 presents content to a user. In some embodiments, the HMD 405 is an embodiment of the HMD 405. Example content includes images, video, audio, or some combination thereof. Audio content may be presented via a separate device (e.g., speakers and/or headphones) external to the HMD 405 that receives audio information from the HMD 405, the console 420, or both. The HMD 405 includes locators 425, inertial measurement units (IMU) 430, position sensors 435, an electronic display 440, and a varifocal block 445 (similar the varifocal block 360 described in FIG. 3B). Additionally the HMD 405 may include an eye tracking module 450, a vergence processing module 455, and a scene rendering module 460.

The locators 425 are objects located in specific positions on the HMD 405 relative to one another and relative to a specific reference point on the HMD 405. The locators 325 are an embodiment of the locators 425. A locator 425 may be a light emitting diode (LED), a corner cube reflector, a reflective marker, a type of light source that contrasts with an environment in which the HMD 405 operates, or some combination thereof. Active locators 425 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 425 can be located beneath an outer surface of the HMD 405, which is transparent to the wavelengths of light emitted or reflected by the locators 425 or is thin enough not to substantially attenuate the wavelengths of light emitted or reflected by the locators 425. Further, the outer surface or other portions of the HMD 405 can be opaque in the visible band of wavelengths of light. Thus, the locators 425 may emit light in the IR band while under an outer surface of the HMD 405 that is transparent in the IR band but opaque in the visible band.

As described above with reference to FIGS. 3A-B, the IMU 430 is an electronic device that generates IMU data based on measurement signals received from one or more of the position sensors 435, which generate one or more measurement signals in response to motion of HMD 405. Examples of the position sensors 435 include accelerometers, gyroscopes, magnetometers, other sensors suitable for detecting motion, correcting error associated with the IMU 430, or some combination thereof.

Based on the measurement signals from the position sensors 435, the IMU 430 generates IMU data indicating an estimated position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, and roll). The IMU 430 can, for example, rapidly sample the measurement signals and calculate the estimated position of the HMD 405 from the sampled data. For example, the IMU 430 integrates measurement signals received from the accelerometers over time to estimate a velocity vector and integrates the velocity vector over time to determine an estimated position of a reference point on the HMD 405. The reference point is a point that may be used to describe the position of the HMD 405. While the reference point may generally be defined as a point in space, in various embodiments, a reference point is defined as a point within the HMD 405 (e.g., a center of the IMU 130). Alternatively, the IMU 430 provides the sampled measurement signals to the console 420, which determines the IMU data.

The IMU 430 can additionally receive one or more calibration parameters from the console 420. As further discussed below, the one or more calibration parameters are used to maintain tracking of the HMD 405. Based on a received calibration parameter, the IMU 430 may adjust one or more of the IMU parameters (e.g., sample rate). In some embodiments, certain calibration parameters cause the IMU 430 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The electronic display 440 displays 2D or 3D images to the user in accordance with data received from the console 420. In various embodiments, the electronic display 440 comprises a single electronic display element (e.g., the electronic display element 355) or multiple electronic displays (e.g., a display for each eye of a user). Examples of the electronic display element include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide display, some other display, or some combination thereof.

The varifocal block 445 adjusts its focal length by adjusting a focal length of one or more varifocal structures. As noted above with reference to FIG. 3B, the varifocal block 445 adjusts its focal length by adjusting a liquid lens structure, e.g., the liquid lens structure 100 of FIG. 1. The varifocal block 445 adjusts its focal length responsive to instructions from the console 420. Note that a varifocal tuning speed of a varifocal structure may be limited by a tuning speed of the liquid lens structure, and accordingly, the liquid lens structure is electrically tuned.

The eye tracking module 450 tracks an eye position and eye movement of a user of the HMD 405. A camera or other optical sensor (that is part the eye tracking module 450) inside the HMD 405 captures image information of a user's eyes, and eye tracking module 450 uses the captured information to determine interpupillary distance, interocular distance, a three-dimensional (3D) position of each eye relative to the HMD 405 (e.g., for distortion adjustment purposes), including a magnitude of torsion and rotation (i.e., roll, pitch, and yaw) and gaze directions for each eye. In one example, infrared light is emitted within the HMD 405 and reflected from each eye. The reflected light is received or detected by the camera and analyzed to extract eye rotation from changes in the infrared light reflected by each eye. Many methods for tracking the eyes of a user can be used by eye tracking module 450. Accordingly, the eye tracking module 450 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 450 integrates information from past measurements, measurements identifying a position of a user's head, and 3D information describing a scene presented by the electronic display 440. Thus, information for the position and orientation of the user's eyes is used to determine the gaze point in a virtual scene presented by the HMD 405 where the user is looking.

The vergence processing module 455 determines a vergence depth of a user's gaze based on the gaze point or an estimated intersection of the gaze lines determined by the eye tracking module 450. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 455 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The scene rendering module 460 receives content for the virtual scene from an engine 480 and provides the content for display on the electronic display 440. Additionally, the scene rendering module 460 can adjust the content based on information from the vergence processing module 455, the IMU 430, and the position sensors 435. The scene rendering module 460 determines a portion of the content to be displayed on the electronic display 440 based on one or more of a tracking module 475, the position sensors 435, or the IMU 430, as described further below.

The imaging device 410 generates imaging data in accordance with calibration parameters received from the console 420. Imaging data includes one or more images showing observed positions of the locators 425 that are detectable by imaging device 410. The imaging device 410 may include one or more cameras, one or more video cameras, other devices capable of capturing images including one or more locators 425, or some combination thereof. Additionally, the imaging device 410 may include one or more filters (e.g., for increasing signal to noise ratio). The imaging device 410 is configured to detect light emitted or reflected from the locators 425 in a field of view of the imaging device 410. In embodiments where the locators 425 include passive elements (e.g., a retroreflector), the imaging device 410 may include a light source that illuminates some or all of the locators 425, which retro-reflect the light towards the light source in the imaging device 410. Imaging data is communicated from the imaging device 410 to the console 420, and the imaging device 410 receives one or more calibration parameters from the console 420 to adjust one or more imaging parameters (e.g., focal length, focus, frame rate, ISO, sensor temperature, shutter speed, aperture, etc.).

The input interface 415 is a device that allows a user to send action requests to the console 420. An action request is a request to perform a particular action. For example, an action request may be to start or end an application or to perform a particular action within the application. The input interface 415 may include one or more input devices. Example input devices include a keyboard, a mouse, a game controller, or any other suitable device for receiving action requests and communicating the received action requests to the console 420. An action request received by the input interface 415 is communicated to the console 420, which performs an action corresponding to the action request. In some embodiments, the input interface 415 may provide haptic feedback to the user in accordance with instructions received from the console 420. For example, haptic feedback is provided by the input interface 415 when an action request is received, or the console 420 communicates instructions to the input interface 415 causing the input interface 415 to generate haptic feedback when the console 420 performs an action.

The console 420 provides content to the HMD 405 for presentation to the user in accordance with information received from the imaging device 410, the HMD 405, or the input interface 415. In the example shown in FIG. 4, the console 420 includes an application store 470, a tracking module 475, and the engine 480. Some embodiments of the console 420 have different or additional modules than those described in conjunction with FIG. 4. Similarly, the functions further described below may be distributed among components of the console 420 in a different manner than is described here.

The application store 470 stores one or more applications for execution by the console 420. An application is a group of instructions, that when executed by a processor, generates content for presentation to the user. Content generated by an application may be in response to inputs received from the user via movement of the HMD 405 or the input interface 415. Examples of applications include gaming applications, conferencing applications, video playback application, or other suitable applications.

The tracking module 475 calibrates the artificial reality system 400 using one or more calibration parameters and may adjust one or more calibration parameters to reduce error in determining position of the HMD 405. For example, the tracking module 475 adjusts the focus of the imaging device 410 to obtain a more accurate position for observed locators 425 on the HMD 405. Moreover, calibration performed by the tracking module 475 also accounts for information received from the IMU 430. Additionally, if tracking of the HMD 405 is lost (e.g., imaging device 410 loses line of sight of at least a threshold number of locators 425), the tracking module 475 re-calibrates some or all of the artificial reality system 400 components.

Additionally, the tracking module 475 tracks the movement of the HMD 405 using imaging information from the imaging device 410 and determines positions of a reference point on the HMD 405 using observed locators from the imaging information and a model of the HMD 405. The tracking module 475 also determines positions of the reference point on the HMD 405 using position information from the IMU information from the IMU 430 on the HMD 405. Additionally, the tracking module 475 may use portions of the IMU information, the imaging information, or some combination thereof, to predict a future location of the HMD 405, which is provided to the engine 480.

The engine 480 executes applications within the artificial reality system 400 and receives position information, acceleration information, velocity information, predicted future positions, or some combination thereof for the HMD 405 from the tracking module 475. Based on the received information, the engine 480 determines content to provide to the HMD 405 for presentation to the user, such as a virtual scene, one or more virtual objects to overlay onto a real world scene, etc.

In some embodiments, the engine 480 maintains focal capability information of the varifocal block 445. Focal capability information is information that describes what focal distances are available to the varifocal block 445. Focal capability information may include, e.g., a range of focus the varifocal block 445 is able to accommodate (e.g., 0 to 4 diopters settings for the tunable liquid lens structures (e.g., liquid lens structure 100) that map to particular focal planes.

The engine 480 generates instructions for the varifocal block 445, the instructions causing the varifocal block 445 to adjust its focal distance to a particular location. The engine 480 generates the instructions based on focal capability information and, e.g., information from the vergence processing module 455, the IMU 430, and the position sensors 435. The engine 480 uses the information from the vergence processing module 455, the IMU 430, and the position sensors 435, or some combination thereof, to select a focal plane to present content to the user. The engine 480 then uses the focal capability information to determine settings for at least one liquid lens structure within the varifocal block 445 that are associated with the selected focal plane. The engine 480 generates instructions based on the determined settings, and provides the instructions to the varifocal block 445.

Additionally, the engine 480 performs an action within an application executing on the console 420 in response to an action request received from the input interface 415 and provides feedback to the user that the action was performed. The provided feedback may be visual or audible feedback via the HMD 405 or haptic feedback via the input interface 415.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A lens comprising:
   a deformable membrane comprising:
      a first conductive layer and a second conductive layer,
      a first piezoelectric membrane layer positioned between the first conductive layer and a ground layer, and
      a second piezoelectric membrane layer positioned between the second conductive layer and the ground layer,
      wherein in response to a first voltage being applied to a first portion of the first conductive layer and a second voltage being applied to a second portion of the first conductive layer, a first portion of the first piezoelectric membrane layer deforms such that a first portion of the deformable membrane has a first curvature associated with a first optical power and, concurrently, a second portion of the first piezoelectric membrane layer deforms such that a second portion of the deformable membrane has a second curvature associated with a second optical power that is different than the first optical power; and
   a transparent fluid enclosed between a substrate layer and the deformable membrane,
      wherein an optical power of the lens is based in part on an index of refraction of the transparent fluid.

2. The lens of claim 1, wherein the substrate layer has a curvature such that the curvature provides optical power to the lens.

3. The lens of claim 1, wherein at least one of the first conductive layer and the second conductive layer comprises a plurality of non-intersecting conductive wires.

4. The lens of claim 1, wherein at least one of the first conductive layer and the second conductive layer comprises a plurality of conductive wires arranged in a crosshatch pattern.

5. The lens of claim 1, wherein, responsive to the first voltage applied to the first conductive layer and the second voltage applied to the first conductive layer, the deformable membrane curves to provide a fixed optical power to the lens.

6. The lens of claim 1, wherein at least one of the first conductive layer and the second conductive layer comprises a plurality of branched conductive wires.

7. The lens of claim 1, wherein at least one of the first piezoelectric membrane layer and the second piezoelectric membrane layer is composed of polyvinylidene fluoride.

8. The lens of claim 1, wherein the lens has a continuous range of optical powers.

9. The lens of claim 1, wherein the transparent fluid has a refractive index that is between 1.2 to 2.5.

10. The lens of claim 1, wherein the substrate layer is transparent to light in an optical band.

11. The lens of claim 10, wherein the optical band is selected from a group consisting of visible light and infrared light.

12. A head-mounted display (HMD) comprising:
a lens comprising:
   a deformable membrane comprising:
      a first conductive layer and a second conductive layer,
      a first piezoelectric membrane layer positioned between the first conductive layer and a ground layer, and
      a second piezoelectric membrane layer positioned between the second conductive layer and the ground layer,
   wherein in response to a first voltage being applied to a first portion of the first conductive layer and a second voltage being applied to a second portion of the first conductive layer, a first portion of the first piezoelectric membrane layer deforms such that a first portion of the deformable membrane has a first curvature associated with a first optical power and, concurrently, a second portion of the first piezoelectric membrane layer deforms such that a second portion of the deformable membrane has a second curvature associated with a second optical power that is different than the first optical power; and
a transparent fluid enclosed between a substrate layer and the deformable membrane, wherein an optical power of the lens is based in part on an index of refraction of the transparent fluid.

13. The HMD of claim 12, wherein the substrate layer has a curvature such that the curvature provides optical power to the lens.

14. The HMD of claim 12, wherein, responsive to the first voltage applied to the first conductive layer and the second voltage applied to the first conductive layer, the deformable membrane curves to provide a fixed optical power to the lens.

15. The HMD of claim 12, wherein at least one of the first conductive layer and the second conductive layer comprises a plurality of branched conductive wires.

16. The HMD of claim 12, wherein the substrate layer is transparent to light in an optical band.

* * * * *